United States Patent
Hänninen

(10) Patent No.: US 10,427,597 B2
(45) Date of Patent: Oct. 1, 2019

(54) SAFETY ARRANGEMENT

(71) Applicant: InnoTrafik Oy, Helsinki (FI)

(72) Inventor: Jouni Hänninen, Seinäjoki (FI)

(73) Assignee: INNOTRAFIK OY, Helsinki (FI)

( * ) Notice: Subject to any disclaimer, the term of this patent is extended or adjusted under 35 U.S.C. 154(b) by 2 days.

(21) Appl. No.: 15/736,525

(22) PCT Filed: Jun. 9, 2016

(86) PCT No.: PCT/FI2016/050412
§ 371 (c)(1),
(2) Date: Dec. 14, 2017

(87) PCT Pub. No.: WO2016/203103
PCT Pub. Date: Dec. 22, 2016

(65) Prior Publication Data
US 2018/0170250 A1    Jun. 21, 2018

(30) Foreign Application Priority Data
Jun. 17, 2015    (FI) .................................. 20150101 U

(51) Int. Cl.
*B60Q 1/52* (2006.01)
*B60Q 9/00* (2006.01)
(Continued)

(52) U.S. Cl.
CPC .............. *B60Q 1/525* (2013.01); *B60Q 5/006* (2013.01); *B60Q 9/008* (2013.01); *F16P 3/142* (2013.01);
(Continued)

(58) Field of Classification Search
CPC ......... B60Q 1/525; B60Q 9/008; F16P 3/142; F16P 3/147; G01S 13/08; G01S 13/886;
(Continued)

(56) References Cited

U.S. PATENT DOCUMENTS

2002/0165645 A1    11/2002    Kageyama
2008/0018472 A1    1/2008    Dasilva et al.
(Continued)

FOREIGN PATENT DOCUMENTS

CN    104680710    6/2015
FR    2 971 608    8/2012
(Continued)

OTHER PUBLICATIONS

International Search Report of PCT/FI2016/050412 dated Sep. 8, 2016, 6 pages.
(Continued)

*Primary Examiner* — Quan-Zhen Wang
*Assistant Examiner* — Rajsheed O Black-Childress
(74) *Attorney, Agent, or Firm* — Nixon & Vanderhye PC

(57) ABSTRACT

The invention comprises a safety system comprising a vehicle identifier (10) arranged to a moving vehicle or work machine (1) and capable of radio communication and, arranged in an operating connection therewith, an alarm unit (20), and a personal identifier (30, 30*a*) arranged in connection with the moving unit and capable of radio communication, the personal identifier (30, 30*a*) comprising an alerting device for warning of vehicles or work machines in the area. In addition, said alarm unit (20) comprises warning equipment for warning of units moving in the area. The vehicle identifier and/or the personal identifier of the safety system are configured to determine a distance between the vehicle identifier and the personal identifier on the basis of at least one signal transmitted between the vehicle identifier and the personal identifier. The vehicle identifier is configured to activate the warning equipment if the distance between the vehicle identifier and the personal identifier is less than a threshold value determined in advance for the vehicle identifier, and the personal identifier is configured to (Continued)

activate the alerting device if the predetermined distance between the vehicle identifier and the personal identifier is less than a threshold value determined in advance for the personal identifier.

16 Claims, 8 Drawing Sheets

(51) Int. Cl.
| | | |
|---|---|---|
| *F16P 3/14* | (2006.01) | |
| *G08G 1/005* | (2006.01) | |
| *G08G 1/16* | (2006.01) | |
| *G01S 13/93* | (2006.01) | |
| *B60Q 5/00* | (2006.01) | |
| *G01S 13/08* | (2006.01) | |
| *G01S 13/88* | (2006.01) | |

(52) U.S. Cl.
CPC ............ *F16P 3/147* (2013.01); *G01S 13/931* (2013.01); *G08G 1/005* (2013.01); *G08G 1/163* (2013.01); *G08G 1/166* (2013.01); *G01S 13/08* (2013.01); *G01S 13/886* (2013.01); *G01S 2013/936* (2013.01); *G01S 2013/9367* (2013.01); *G01S 2013/9375* (2013.01); *G01S 2013/9378* (2013.01)

(58) Field of Classification Search
CPC ............ G01S 13/931; G01S 2013/936; G01S 2013/9367; G01S 2013/9375; G01S 2013/9378; G08G 1/005; G08G 1/163; G08G 1/166
See application file for complete search history.

(56) References Cited

U.S. PATENT DOCUMENTS

| | | | | |
|---|---|---|---|---|
| 2009/0072631 | A1* | 3/2009 | Iida | B25J 19/06 |
| | | | | 307/326 |
| 2010/0289662 | A1* | 11/2010 | Dasilva | F16P 3/147 |
| | | | | 340/686.6 |
| 2011/0227747 | A1* | 9/2011 | Thomas | B60Q 9/008 |
| | | | | 340/686.6 |
| 2011/0249118 | A1 | 10/2011 | Bruno | |
| 2012/0295575 | A1 | 11/2012 | Nam | |
| 2013/0271274 | A1 | 10/2013 | Ebert | |
| 2014/0309918 | A1 | 10/2014 | Rivet | |
| 2016/0180713 | A1* | 6/2016 | Bernhardt | B66F 17/003 |
| | | | | 701/70 |
| 2018/0151078 | A1* | 5/2018 | Frederick | F16P 3/145 |

FOREIGN PATENT DOCUMENTS

| | | |
|---|---|---|
| JP | 63-142500 | 6/1988 |
| JP | 2000-339029 | 12/2000 |
| JP | 2002-271869 | 9/2002 |
| JP | 2005-346228 | 12/2005 |
| JP | 2013-518501 | 5/2013 |
| WO | 2007/010795 | 1/2007 |
| WO | WO 2014/056099 | 4/2014 |

OTHER PUBLICATIONS

Written Opinion of the ISA of PCT/FI2016/050412 dated Sep. 8, 2016, 10 pages.
Koyuncu et al. "A Survey of Indoor Positioning and Object Locating Systems", International Journal of Computer Science and Network Security, May 2010, vol. 10, No. 5, pp. 121-128.
Extended Search Report dated Jan. 25, 2019 in corresponding European Application No. 16811082.3, 7 pages.
Office Action dated Jan. 22, 2019 in corresponding Japanese Application No. 2018-517494 (with partial English translation), 7 pages.

* cited by examiner

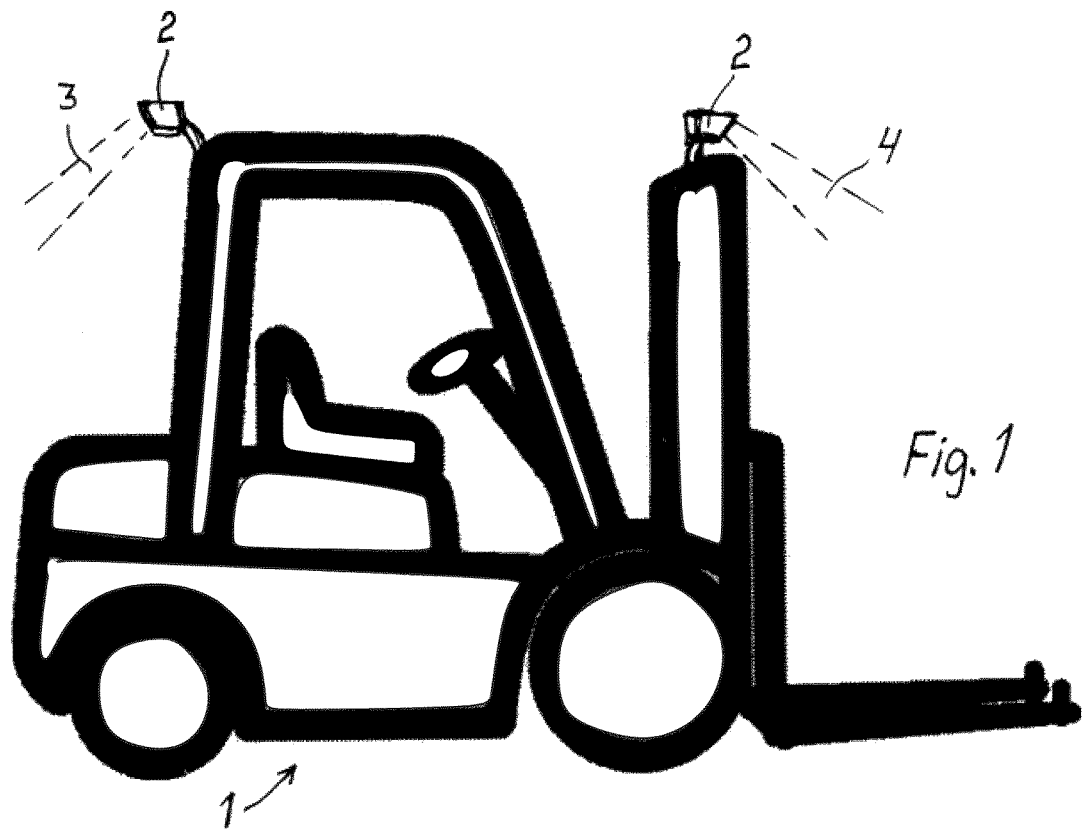
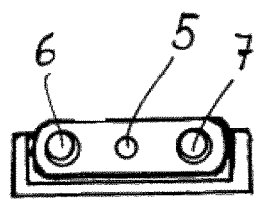
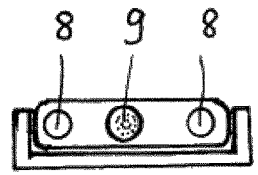

SAFETY ARRANGEMENT

This application is the U.S. national phase of International Application No. PCT/FI2016/050412 filed Jun. 9, 2016 which designated the U.S. and claims priority to FI Patent Application No. U20150101 filed Jun. 17, 2015, the entire contents of each of which are hereby incorporated by reference.

BACKGROUND OF THE INVENTION

The invention relates to a safety system and to a method for activating a safety system.

Traffic in manufacturing plants and warehouses is often lively, yet traffic safety is usually inadequate. Also varying guides and unmarked routes cause problems in communication and impair safety at work. Vehicles and work machines may have a backup beeper, for example, as a warning device which is usually activated automatically when in reverse. On top of the roof of a work machine there may also be a warning light beacon that emits yellow flashing light when the work machine is moving in an area where there are people or other traffic.

A disadvantage of these prior art warning devices is that a backup beeper, for example, may not necessarily be audible inside industrial plants, in particular as people wear hearing protectors there. The light of a warning beacon on top of a work machine roof does not reach around a corner and is therefore not able to provide warning when aisle crossings are approached from different directions at the same time. A further problem with the prior art warning devices is that the yellow light they emit may easily be confused with yellow warning lights of cleaning machines or other work machines.

SUMMARY OF THE INVENTION

An object of the invention is thus to provide a method and equipment implementing the method so as to solve the aforementioned problems. The object of the invention is achieved by a method and system which are characterized by what is disclosed in the independent claims. Some preferred embodiments of the invention are disclosed in the dependent claims.

The invention is based on a safety system comprising a vehicle identifier arranged to a moving vehicle or work machine and capable of radio communication and, arranged in an operating connection therewith, an alarm, and a personal identifier arranged in connection with the moving unit and capable of radio communication, the identifier comprising an alerting device for warning of vehicles or work machines in the area. In addition, said alarm unit comprises warning equipment for warning of units moving in the area. The vehicle identifier and/or the personal identifier of the safety system are configured to determine a distance between the vehicle identifier and the personal identifier on the basis of at least one signal transmitted between the vehicle identifier and the personal identifier. The vehicle identifier is configured to activate the warning equipment if the determined distance between the vehicle identifier and the personal identifier is less than a threshold value determined in advance for the vehicle identifier, and the personal identifier is configured to activate the alerting device if the determined distance between the vehicle identifier and the personal identifier is less than a threshold value determined in advance for the personal identifier.

An advantage of the method and system of the invention is that a person or a vehicle in the area may be provided with a signal transmitter capable of transmitting a signal at a predetermined distance from another vehicle for reception and thus indicate its presence in the area. Others moving in the area are thus capable of taking into account that there also is other movement nearby. The safety system is able to detect forklifts and other vehicles and to distinguish them from pedestrians and to warn the driver of the machine and the people of an eventual risk of collision over a radio link. This allows the general appearance in the working environment to be kept stable, the amount of panic breakings to be reduced and the drivers to concentrate on taking the deliveries to their targets. In addition, pedestrian safety is significantly improved when warning of nearby traffic is provided by means of different alarm devices.

Moreover, safety zones for people to safely stay in may be defined in manufacturing plants and warehouses. In the safety zone, the alerting devices carried by individuals become automatically switched off. This further enhances safety because people like to seek to areas where the lights of the alarm devices are not flashing and sound signals are switched off. The safety system also enables different doors to the automatically opened for moving vehicles or work machines approaching them. In addition, individuals may be provided with a personal identifier having a remote identifier for opening doors. An approaching vehicle or work machine may also be effectively detected by arranging the warning to be provided as a sharp pattern of light at a suitable distance in front of or behind the arriving vehicle. Lighting arrangements of this type are extremely affordable to install. Equipment provided with an infrared (IR) identifier, a radar-type device or camera detection, for example, further improves and ensures the detection of others in an area. It is also possible to monitor the movements of persons, vehicles and work machines by means of a positioning system. On the basis of the information obtained, it is easy to see where individuals and machines meet most often and to prepare a safety plan for high-risk places.

LIST OF FIGURES

The invention will now be described in more detail in connection with preferred embodiments and with reference to the accompanying drawings, in which:

FIG. 1 shows a work machine provided with equipment of the invention;

FIG. 2 shows a unit emitting a warning light and transmitting an alarm signal;

FIG. 3 shows the unit of FIG. 2 from behind;

DETAILED DESCRIPTION OF THE INVENTION

Figure 4:
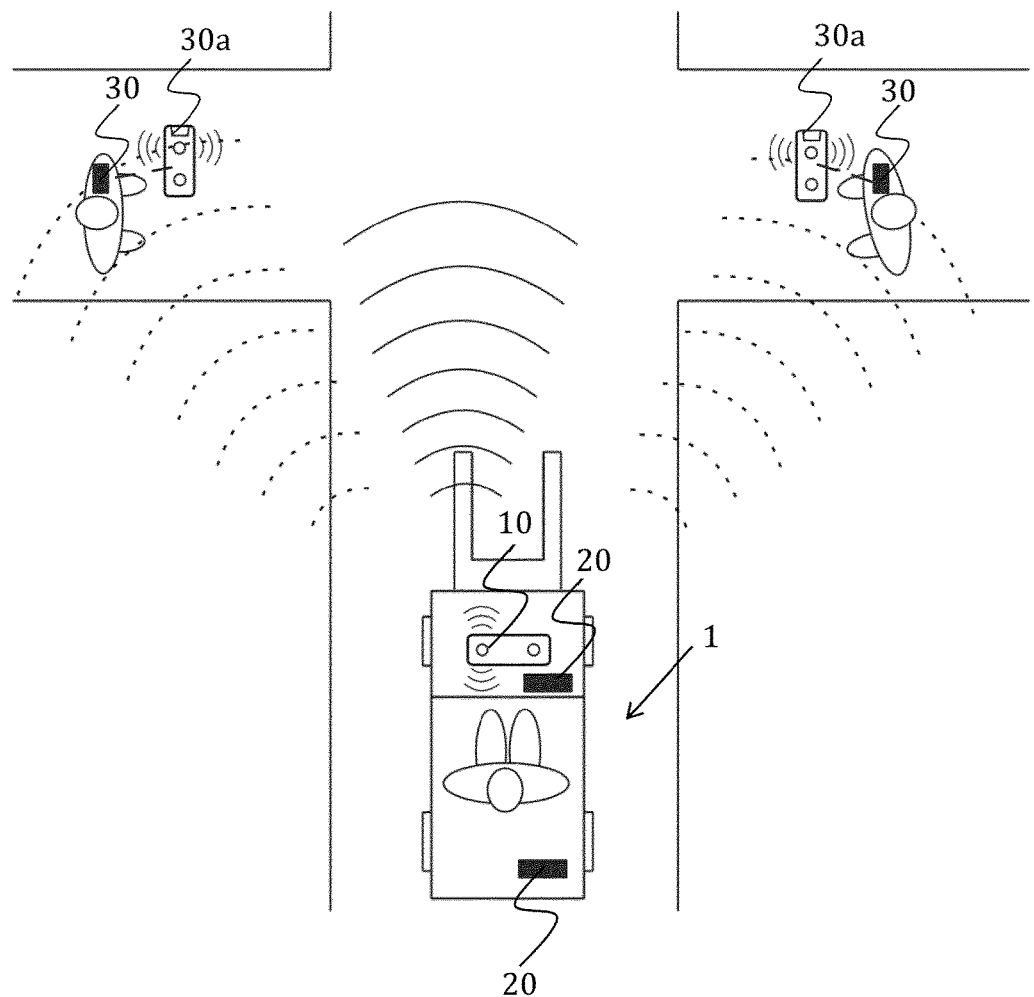
FIG. 4 shows a safety system according to an embodiment.

FIG. 1 shows a work machine 1 which is a forklift that is mainly used in work areas and in aisles of warehouses and industrial plants, and often the load it carries forms a fairly large visual obstacle for the driver in forward driving. In accordance with the invention, the work machine has units 2 installed thereto at a suitable height both at the front and the back for emitting a warning light and transmitting a warning sound. When necessary, e.g. when the work machine 1 is moving, said units 2 emit sharp light beams 3 and 4 onto the floor to a distance of about 3 to 6 meters from the work machine. The lights are most preferably coloured, e.g. blue and red, in order make sure they are distinguished from the floor. For this purpose, the units 2 are provided with lenses 6 and 7 (FIG. 2) that allow a sharp coloured and easily discernible oval pattern, for example, to be formed on the floor.

The unit 2 shown in FIG. 2 is directed to most preferably emit light patterns of different colours from the work machine on the floor through the lenses 6 and 7, yet not at the same time. Blue light, for example, is emitted through lens 6 and red light through lens 7. In the middle of the unit 2 there is an infrared identifier 5 for detecting the presence of a person from a distance and, likewise, another vehicle may be detected due to its thermal effect. A radar-type device or camera detection with image recognition may also be used for detection. The detections made by the detectors are configured to activate a beeper 9 and yellow warning lights 8 (FIG. 3) of the unit 2 connected to the vehicle.

FIG. 3 shows the unit 2 from behind, lamps 8 emitting the yellow flashing light and, in the middle, the beeper 9 transmitting a warning signal being provided on this side.

In an embodiment, another vehicle, work machine 1 or person moving in the area is provided with a signal transmitter configured to respond to a call from a transmitter in the work machine 1, for example, at a predetermined distance or to transmit a signal such that it reaches the receiver unit in the work machine at least from a predetermined distance, thus indicating to the driver of the work machine the presence of said other vehicle or person in the vicinity.

As the work machine 1 receives the signal indicating the presence of a person or another vehicle in the area, the warning equipment activates an alarm, such as the beeper 9 or the warning light 8, to warn the driver of the work machine.

An embodiment comprises warning equipment arranged in vehicles or work machines 1 moving mainly inside buildings to warn the driver, people moving in the area or drivers of other vehicles, the equipment comprising units 2 at least emitting a warning light and transmitting a warning sound. The warning equipment is configured to emit a coloured pattern of light targeted to the floor in front of and/or behind the vehicle, at least when the vehicle is moving, in order to indicate that the vehicle is approaching or leaving. In an embodiment, said vehicle is provided with units 2 emitting lights of different colours at the front and/or at the back thereof. The units 2 may comprise an infrared (IR) detector 5, radar or a camera-operated detector operating at a predetermined distance to detect the presence of a person or a vehicle within said distance, said detection being arranged to activate the beeper 9 and the yellow warning lights 8 connected to the vehicle.

In an embodiment, another vehicle or person moving in the area is provided with a signal transmitter configured to respond to a call from the transmitter in the vehicle at a predetermined distance or to transmit a signal such that it reaches the receiver unit in the vehicle at least from a predetermined distance, thus indicating the presence of said other vehicle or person in the vicinity. As the unit in the vehicle receives the signal indicating the presence of the person or other vehicle in the area, it may activate an alarm from the warning equipment, such as the beeper sound or an alarm light, to warn the driver.

FIG. 4 shows a safety system comprising a vehicle identifier 10 arranged to a moving vehicle or work machine 1 and capable of radio communication and, arranged in an operating connection therewith, alarm units 20 capable of radio communication. One or more alarm units may be provided, and they may be located at the front and/or back of the work machine 1, such as a forklift. The alarm units 20 may be placed inside the work machine 1, for example close to the control panel, or to some other suitable place where they are easily observed by the driver in an alarm situation. The safety system may also comprise personal identifiers 30 arranged to a moving unit and capable of radio communication, the personal identifiers comprising an alerting device 32 for warning of vehicles or work machines 1 in the area. The moving unit may comprise a vehicle, a work machine 1 or a person. The personal identifier 30 may be rapidly installed to a work uniform, for example in a pocket of an overall or to a separate loop.

FIG. 4 shows the work machine 1, such as a forklift, approaching a crossing and two people moving in the vicinity of the crossing. When seen from the work machine 1, both the persons are behind a corner, the driver of the work machine 1 being thus unable to see them and, correspondingly, the persons unable to see the approaching work machine 1. Manufacturing plants or warehouses may be very noisy or the persons may be wearing hearing protectors, for which reason they cannot hear the approaching work machine 1, which may cause a hazardous situation when it emerges from behind the corner. The persons are carrying personal identifiers 30 that communicate with the vehicle identifier 10 and are able to issue a sound signal, vibration and/or light effects to provide a warning of the approaching work machine. In FIG. 4 the personal identifiers 30 are attached to the shoulder of the person and are depicted as a black rectangle. An enlarged diagram 30a of the personal identifier 30 is shown in front of the person.

Figure 5:
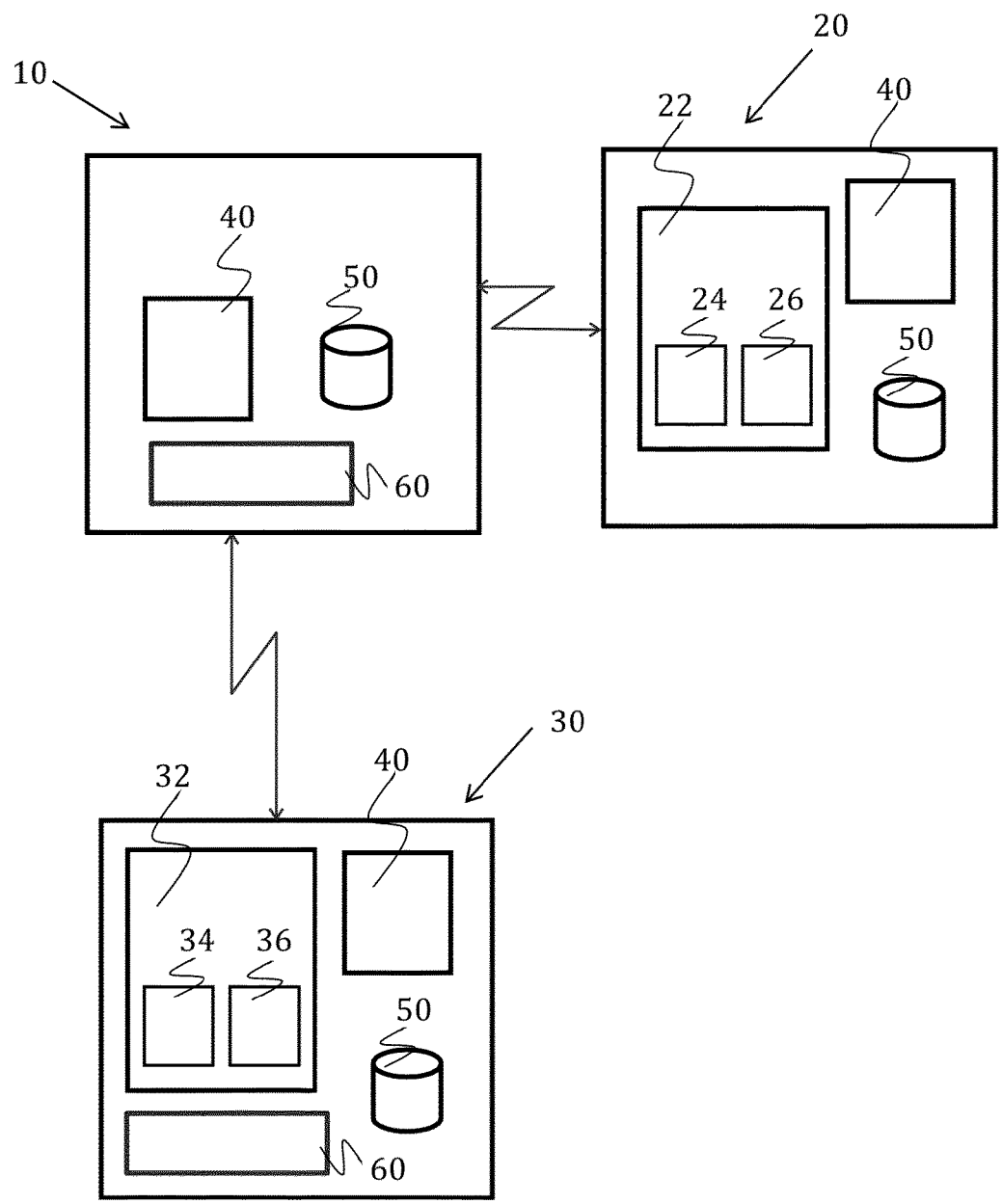
FIG. 5 is a diagram of a safety system according to an embodiment.

FIG. 5 is a diagram of a safety system according to an embodiment. The safety system comprises the vehicle identifier 10, the alarm unit 20 and the personal identifier 30. The vehicle identifier 10 may be placed to the vehicle or work machine 1 and it may comprise communication means 40, such as the transmitter and the receiving unit mentioned above. A plural number of vehicle identifiers 10 may also be provided, in case there are several moving vehicles or work machines 1 in the area, and they may communicate with each other. The communication means 40 are configured to at least receive data but they are preferably also configured to transmit data from the vehicle identifier 10 to either the alarm unit 20, the personal identifier 30, another vehicle identifier 10 or to some other device. In its simplest form, the communication means 40 may be a twin cable, in which data is expressed as a variation in voltage. The communication means 40 is preferably a wireless radio transceiver capable of communicating with external devices, such as other vehicle identifiers 10, alarm units 20, personal identifiers 30 or other equipment. The wireless connection may be implemented using various methods, frequencies and protocols, their significance for the end result being small as the amount of data to be transferred is very small. In addition to radio waves, communication over the wireless communication means 40 may be based on e.g. sound, light or some other wireless means.

The vehicle identifier 10 that comprises the wireless communication means 40 has an energy source 50 from which the vehicle identifier 10 draws the electric power it needs. The energy source 50 may be a connection to a moving vehicle or work machine 1, for example, from which it receives its energy, or an accumulator, a single-use battery, an energy harvester and/or some other energy source. The vehicle identifier 10 may also comprise a processor 60 that enables it to process data travelling between different devices. The processor 60 may be configured to compute distances between different devices, whereby it is able to measure signal propagation times, for example, between the different devices.

One or more alarm units 20 may be provided and they may comprise warning equipment 22, such as the warning equipment described above, which provides a warning, such as the beeper or the warning light, to warn the driver of the work machine, when another vehicle or person is in the area. The alarm unit 20 is typically located in the same vehicle or work machine 1 as the vehicle identifier. The warning equipment 22 may comprise a lighting element 24 and/or a sound element 26. The lighting element 24 may comprise a light source, such as the warning light 8. In addition, the lighting element 24 may comprise one or more patterned lenses 6, 7. The sound element 26 may comprise a beeper 9 producing a warning sound or some other sound producing device. The sound element 26 is not compulsory because a constant beeping sound may disturb the driver, especially if there is a lot of other traffic. The alarm unit 20 may also comprise communication means 40 and an energy source 50, whose functionality may be similar to the communication means 40 and the energy source 50 in the vehicle identifier 10. The vehicle identifier 10 and the alarm unit 20 may be physically separate units and communicate with each other over the communication means 40, or, alternatively, they may reside in the same device.

One or more personal identifiers 30 may be provided, depending on the amount of traffic or persons in the area. The personal identifier 30 may comprise an alerting device 32, which may be similar to the alerting device disclosed above and which activates a warning, such as a beeper or a warning light, to warn a moving unit, such as a person of a moving vehicle or work machine 1 in the area. The alerting device 32 may comprise a lighting element 34 and a sound element 36. The lighting element 34 may comprise a light source, such as the warning light 8. The sound element 36 may comprise the beeper 9 producing a warning sound or it may produce vibration, for example. The personal identifier 30 may also comprise communication means 40 and an energy source 50, whose functionality may be similar to the communication means 40 and the energy source 50 in the vehicle identifier 10 or the alarm unit 20. In addition, the personal identifier 30 may comprise a processor 60, which may be configured to compute distances between different devices by measuring signal propagation times between the different devices, for example the distance of the vehicle identifier 10 from the personal identifier 30.

The vehicle identifier 10 and the personal identifier 30 are configured to determine the distance between the vehicle identifier 10 and the personal identifier 30 on the basis of at least one signal transmitted between the vehicle identifier 10 and the personal identifier 30. The personal identifier 30 may be charged in a wireless charging unit and it may be attached to the clothes of a person moving in the area. In their basic mode, the personal identifier 30 and the vehicle identifier 10 may broadcast a signal continuously. In an embodiment, the vehicle identifier 10 is configured to broadcast a signal continuously when the vehicle or work machine is running, the signal transmission starting when the vehicle or work machine 1 is started. In another embodiment, the vehicle identifier 10 is configured to broadcast a signal continuously when the vehicle or work machine 1 is moving, the signal transmission starting when the vehicle is put into gear. When the vehicle identifier 10 and the personal identifier 30 is used for transmission, the operating range of the signal may be adjusted and it may vary between 0 and 40 meters indoors and between 0 and 200 meters outdoors, for example.

In an embodiment, the distance between the vehicle identifier 10 and the personal identifier 30 is determined so that the personal identifier 30 searches for vehicle identifiers 10 in the vicinity. If the personal identifier 30 receives a signal from the vehicle identifier 10, exchange of messages takes place at the end of which the vehicle identifier 10 informs the measured distance to the personal identifier 30. The distance is determined by measuring the signal propagation time. If the measured distance is less than the threshold values determined for the personal identifier and the vehicle identifier, warnings are activated both in the warning equipment 22 and the alerting device 32. However, both detectors are not switched on simultaneously if only one of the threshold values is not reached.

Figure 6:
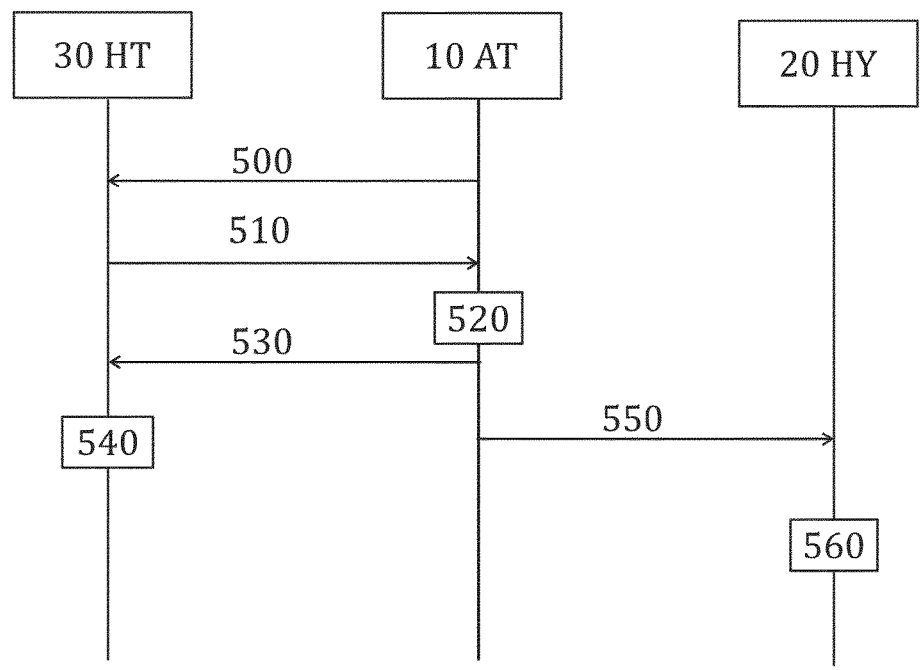
FIG. 6 is a signal path diagram according to an embodiment.

FIG. 6 is a signal path diagram according to an embodiment. It shows that the personal identifier 30 (HT) receives a signal 500 from the vehicle identifier 10 (AT), as a result of which the personal identifier 30 transmits a signal 510 to the vehicle identifier 10. Upon reception of the signal 510, the vehicle identifier 10 is configured to determine 520 the distance between the vehicle identifier 10 and the personal identifier 30 on the basis of at least one signal transmitted between the vehicle identifier 10 and the personal identifier 30. This may be implemented by configuring the processor 60 of the vehicle identifier 10 to compute 520 the distance on the basis of the data provided in the received signal 510, such as the output time and the reception time of the signal, or by some other suitable means. Next, the vehicle identifier 10 transmits a response signal 530 to the personal identifier 30, the response signal 530 comprising the value of the distance between the vehicle identifier 10 and the personal identifier 30. The personal identifier 30 receives the response signal 530 from the vehicle identifier 10. The personal identifier 30 is configured to activate 540 the alerting device 32 if the determined distance between the vehicle identifier 10 and the personal identifier 30 is less than a threshold value determined in advance for the personal identifier. At the same time, also the vehicle identifier 10 is configured to activate the warning equipment 22 if the determined distance between the vehicle identifier 10 and the personal identifier 30 is less than a threshold value determined in advance for the vehicle identifier. The activation is implemented by the vehicle identifier 10 transmitting a signal 550 to the alarm unit 20 (HY), which activates 560 the warning equipment 22. The threshold values for the vehicle identifier 10 and the personal identifier 30 may be determined case-specifically and they may be unequal. For example, if a person is at 10 meters from the moving vehicle or work machine 1, the warning equipment 22 is activated, the warning lights 8, for example, being thus activated. Consequently, the driver understands that there are pedestrians nearby and slows down. When the moving vehicle or work machine 1 is for example at 5 meters from a person, the alerting device 32 of the personal identifier 30 is activated, and, consequently, the warning light 8 or beeper 9 is activated or the personal identifier 30 vibrates. Hence the person understands that there is a work machine 1 nearby and pays more attention to the environment. In an embodiment, the vehicle identifier 10 and/or the personal identifier 30 are configured to determine the distance between the vehicle identifier 10 and the personal identifier 30 on the basis of two or more signals transmitted between the vehicle identifier 10 and the personal identifier 30. Other methods applicable for distance measuring may also be employed.

Figure 7:
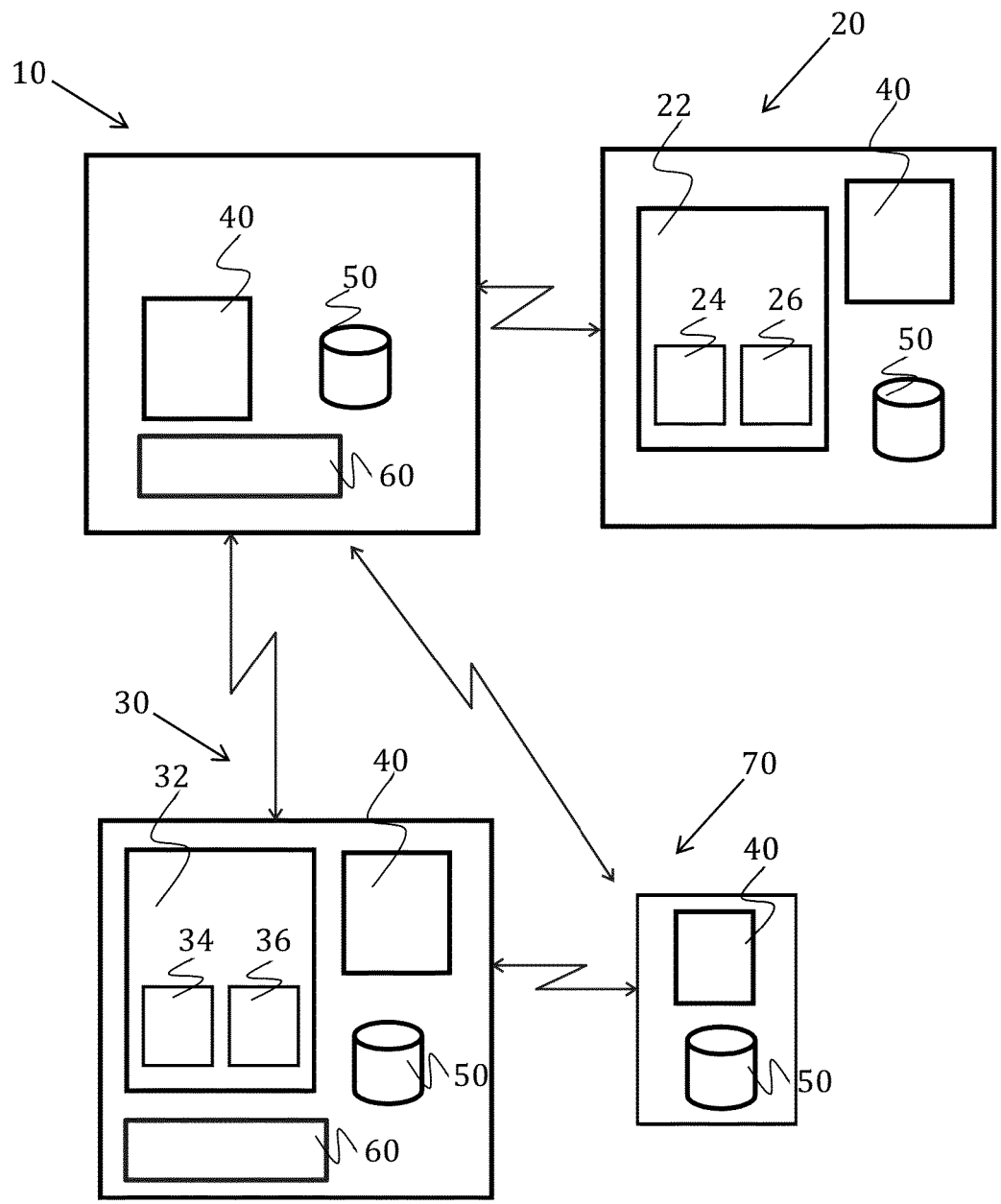
FIG. 7 is a diagram of a safety system according to an embodiment.

FIG. 7 is a diagram of a safety system according to an embodiment. FIG. 7 shows a safety system corresponding to the one in FIG. 6 and comprising, additionally, a counter radio 70. The counter radio 70 comprises communication means 40 and an energy source 50, whose functionality may be similar to the communication means 40 and the energy source 50 in the vehicle identifier 10, the alarm unit 20 or the personal identifier 30. With the help of the counter radio 70, safety zones may be provided outdoors or indoors, e.g. inside a manufacturing plant or a warehouse, where individuals, for example, may safely reside without the alerting device 32 of the personal identifiers 30 having to be activated in the vicinity of moving vehicles or work machines 1. Examples of these areas include office premises, fenced areas or the like within the area. When the counter radio 70 is at a predetermined distance from the personal identifier 30, the personal identifier does not activate its alerting device 32 and, at the same time, it stops transmitting the signal to the vehicle identifier 10 and thus the vehicle identifier 10 does not activate the warning equipment 22 either. This reduces unnecessary activation of lights and beepers and, at the same time, encourages persons to place themselves close 70 to the counter radio in the safety zone, which at the same time increases the safety of all those moving in the area. In an embodiment, the personal identifier 30 and/or the counter radio 70 are configured to determine the distance between the personal identifier 30 and the counter radio 70 on basis of the at least one signal transmitted between the personal identifier 30 and the counter radio 70. The personal identifier 30 is configured to interrupt the transmission of a signal and the activation of the alerting device 32 if the determined distance between the personal identifier 30 and the counter radio 70 is less than a predetermined threshold value. The threshold value for the counter radio may be determined case-specifically, but it may be 0 to 10 m, for example.

Figure 8:
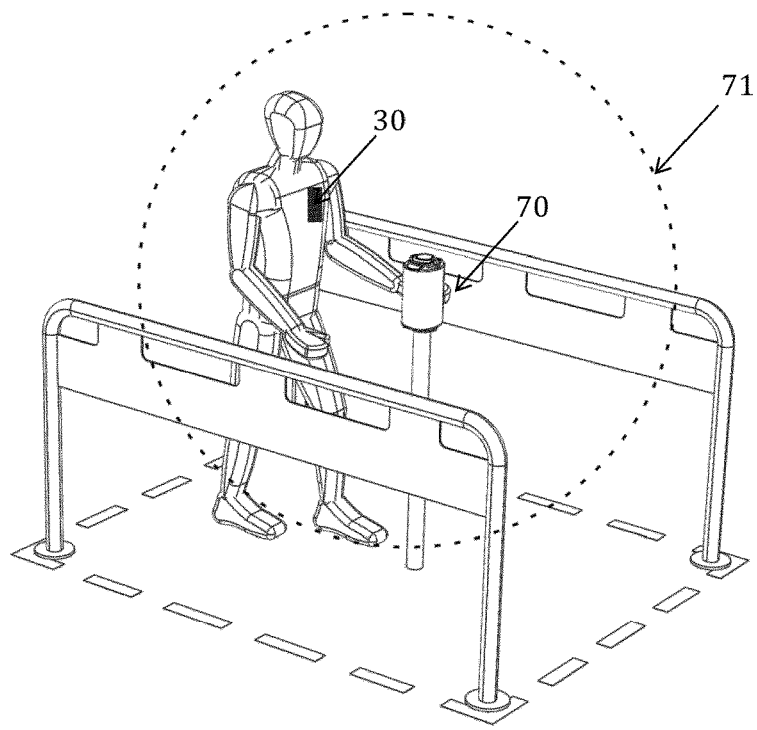
FIG. 8 shows the operation of a counter radio according to an embodiment.

FIG. 8 illustrates the operation of the counter radio 70. In FIG. 8 a person is within a safety zone defined by fences and depicted by a dash line. The figure shows that the counter radio 70 is broadcasting a spherical signal 71 within a radius of 3 or 5 meters, for example. If the determined distance between the personal identifier 30 and the counter radio 70 is less than a predetermined threshold value for the counter radio, the personal identifier 30 does not transmit a signal to the vehicle identifier 10, and thus the alerting device 32 of the personal identifier 30 is not activated, nor is a signal transmitted to the vehicle identifier 10. In that case, the alarm systems are not switched on and the driver may carry on working without interruption and it is also more convenient for the person to be in the safety zone when there are no flashing lights or sound alarms.

Figure 9:
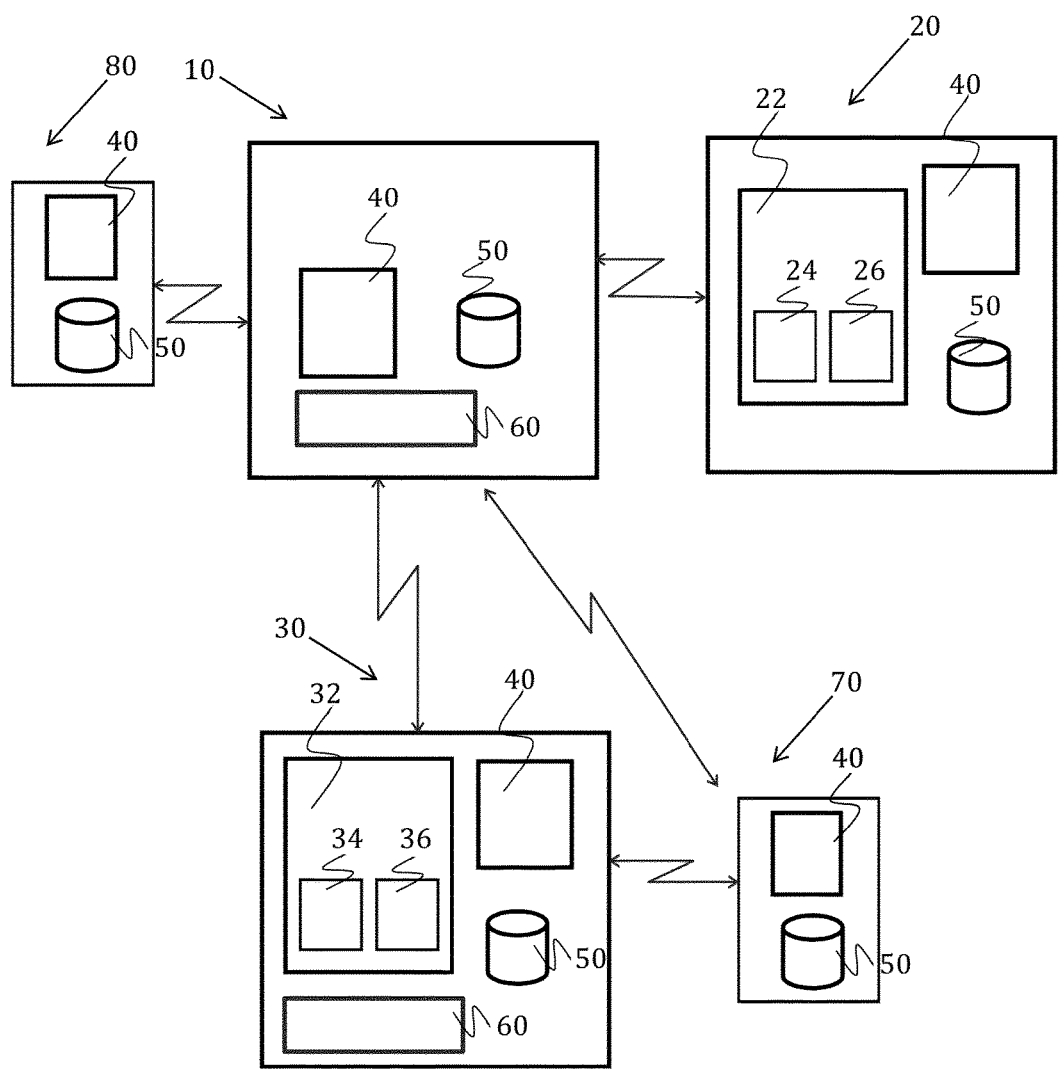
FIG. 9 is a diagram of a safety system according to an embodiment.

FIG. 9 is a diagram of a safety system according to an embodiment. FIG. 9 shows a safety system corresponding to the one in FIG. 8 and comprising, additionally, a sensor 80 capable of radio communication. The sensor 80 may be placed in connection with a door, such as an upward acting door, and it may be configured to open the door when a moving vehicle or work machine 1 is at a predetermined distance from the door. The sensor 80 comprises communication means 40 and an energy source 50, whose functionality may be similar to the communication means 40 and the energy source 50 in the vehicle identifier 10, the alarm unit 20 or the personal identifier 30. In addition, the sensor 80 may comprise a processor, which may be configured to compute distances between different devices by measuring signal propagation times between the different devices. In an embodiment, the vehicle identifier 10 and/or the sensor 80 are configured to determine the distance between the vehicle identifier 10 and the sensor 80 on the basis of at least one signal transmitted between the vehicle identifier 10 and the sensor 80. The sensor 80 is configured to activate the opening of the door, if the determined distance between the vehicle identifier 10 and the sensor 80 is less than a threshold value determined in advance for the sensor.

In an embodiment, the distance between the vehicle identifier 10 and the sensor 80 is determined so that the sensor 80 searches for vehicle identifiers 10 in the vicinity. If the sensor 80 receives a signal from the vehicle identifier 10, exchange of messages takes place at the end of which the vehicle identifier 10 informs the measured distance to the sensor 80. The distance is determined by measuring the signal propagation time. The distance may be determined so that when the sensor 80 receives a signal from the vehicle identifier 10, it transmits the signal to the vehicle identifier 10, the vehicle identifier 10 then computing the distance between the devices and sending the result to the sensor 80. If the measured distance is less than the threshold value for the sensor, the sensor 80 activates the opening of the door. In an embodiment, the sensor 80 may also use its processor to compute the distance between the vehicle identifier 10 and the sensor 80.

Figure 10:
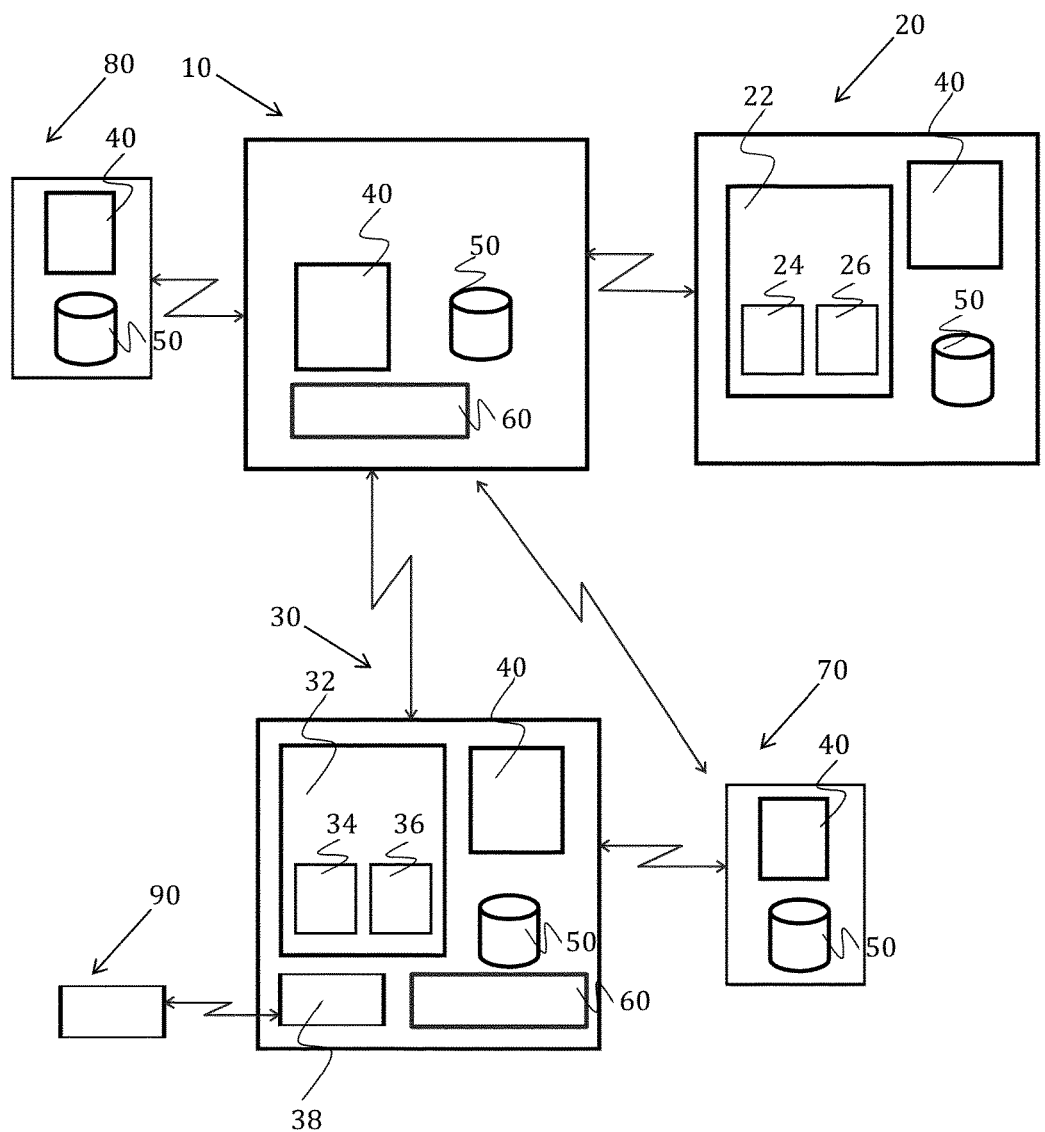
FIG. 10 is a diagram of a safety system according to an embodiment.

FIG. 10 is a diagram of a safety system according to an embodiment. FIG. 10 shows a safety system corresponding to the one in FIG. 9 and comprising, additionally, a reader 90 of a remote identifier and a remote identifier 38 installed in the personal identifier 30 and capable of radio communication, the remote identifier being configured to open a door or some other locking when the remote identifier is taken close to the remote identifier reader 90. In an embodiment, the remote identifier is an RFID tag and the reader of the remote identifier is an RFID reader. With the help of the remote identifier 38 and its reader 90, the personal identifier 30 may be used also for opening doors and other locks so that no separate opener is needed for these functions, which makes it easier for people to move in the area. In an embodiment, the safety system comprises the vehicle identifier 10, the alarm unit 20 and the personal identifier 30 and at least one of the following: the counter radio 70, the sensor 80, the remote identifier 38 and the remote identifier reader 90.

In an embodiment, the safety system further comprises at least three base stations capable of radio communication and configured to determine position data of the vehicle identifier 10 and/or the personal identifier 30 on the basis of at least one signal transmitted between said base stations and the vehicle identifier 10 and/or the personal identifier 30. The position data may be determined by applying triangular measurement or some other suitable measurement method. In an embodiment, at least one base station is configured to transmit the position data of the vehicle identifier 10 and/or the personal identifier 30 to a server. The base stations may be connected to a local area network (LAN), a radio network, such as a telephone network, a cloud service or the Internet for forwarding the data to the server, for example. The position data of the vehicle identifier 10 and the personal identifier 30 may be used for monitoring the movements of persons, vehicles and/or work machines 1 within the area. If during one day, for example, a large number encounters between persons and vehicles is observed, the routes of vehicles and persons may be re-designed to increase safety.

In an embodiment, the vehicle identifier 10 of the safety system comprises communication means 40 configured to set up a wired and/or wireless connection with and to transmit or receive data from at least one of the following: the alarm unit 20, the personal identifier 30, the counter radio 70 and the sensor 80.

In an embodiment, the alarm unit 20 of the safety system comprises communication means 40 configured to set up a wired and/or wireless connection with and to transmit data to and receive it from at least the vehicle identifier 10.

In an embodiment, the personal identifier 30 of the safety system comprises communication means 40 configured to set up a wireless connection with and to transmit data to or receive it from at least one of the following: the vehicle identifier 10, the counter radio 70 and the remote identifier reader 90.

Figure 11:
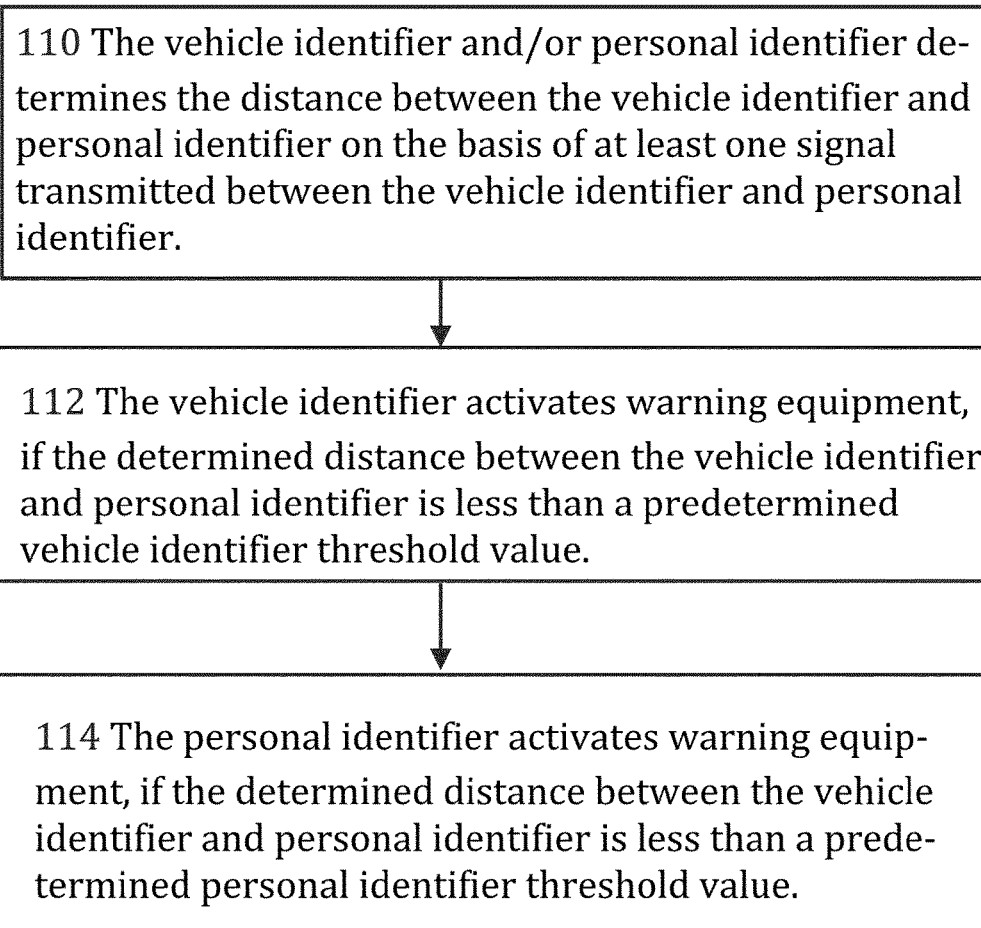
FIG. 11 shows a method according to an embodiment.

FIG. 11 shows a method for activating a safety system. The safety system comprises a vehicle identifier 10 arranged to a moving vehicle or work machine 1 and capable of radio communication and, arranged in an operating connection therewith, an alarm unit 20 and a personal identifier 30 arranged in connection with the moving unit and capable of radio communication. The personal identifier 30 comprises an alerting device 32 to issue warnings of vehicles or work machines in the area, said alarm unit 20 comprising warning equipment 22 for warning of units moving in the area.

In the method, the vehicle identifier 10 and/or the personal identifier 30 determine 110 a distance between the vehicle identifier 10 and the personal identifier 30 on the basis of at least one signal transmitted between the vehicle identifier 10 and the personal identifier 30. The vehicle identifier 10 activates 112 the warning equipment 22 if the determined distance between the vehicle identifier 10 and the personal identifier 30 is less than a threshold value determined in advance for the vehicle identifier. The personal identifier 10 activates 114 the alerting device 32 if the determined distance between the vehicle identifier 10 and the personal identifier 30 is less than a threshold value determined in advance for the personal identifier.

The safety system according to the invention may be used indoors, for example in warehouses or industrial facilities, but it is also suitable for use outdoors.

A person skilled in the art will find it obvious that, as technology advances, the basic idea of the invention may be implemented in various ways. The invention and its embodiments are thus not restricted to the above examples but may vary within the scope of the claims.

The invention claimed is:

1. A safety system comprising a vehicle identifier arranged in connection with a moving vehicle or work machine and capable of radio communication and, arranged in an operating connection therewith, an alarm unit, and a personal identifier arranged in connection with a moving unit and capable of radio communication, the personal identifier comprising an alerting device for warning of vehicles or work machines in the area, and said alarm unit comprising warning equipment for warning of moving units in the area, wherein:
   the vehicle identifier and/or the personal identifier is configured to determine a distance between the vehicle identifier and the personal identifier based on at least one signal transmitted between the vehicle identifier and the personal identifier;
   the vehicle identifier is configured to activate the warning equipment in response to the determined distance between the vehicle identifier and the personal identifier being less than a threshold value determined in advance for the vehicle identifier;
   the personal identifier is configured to activate the alerting device in response to the determined distance between the vehicle identifier and the personal identifier being less than a threshold value determined in advance for the personal identifier;
   the safety system further comprising a counter radio capable of radio communication, wherein the counter radio is configured to broadcast a spherical signal, and wherein the personal identifier is configured to determine a distance between the personal identifier and the counter radio based on the at least one signal transmitted between the personal identifier and the counter radio; and
   wherein the personal identifier is configured to interrupt the transmission of the at least one signal transmitted between the vehicle identifier and the personal identifier and the activation of the alerting device and warning equipment, in response to the determined distance between the personal identifier and the counter radio being less than a threshold value determined in advance for the counter radio.

2. The safety system as claimed in claim 1, wherein the vehicle identifier and/or the personal identifier is/are configured to determine the distance between the vehicle identifier and the personal identifier by measuring a signal propagation time between the vehicle identifier and the personal identifier.

3. The safety system as claimed in claim 1, wherein the vehicle identifier is configured to broadcast a signal continuously when the vehicle or work machine is running or moving.

4. The safety system as claimed in claim 1, wherein the moving unit comprises a vehicle, a work machine, or a person.

5. The safety system as claimed in claim 1, wherein the alerting device and/or the warning equipment comprises a lighting element and/or a sound element.

6. The safety system as claimed in claim 1, further comprising a sensor capable of radio communication, wherein
   the vehicle identifier and/or the sensor is configured to determine a distance between the vehicle identifier and the sensor based on at least one signal transmitted between the vehicle identifier and the sensor; and
   the sensor is configured to activate the opening of a door in response to the determined distance between the vehicle identifier and the sensor being less than a threshold value determined in advance for the sensor.

7. The safety system as claimed in claim 1, further comprising at least three base stations capable of radio communication and configured to determine position data of the vehicle identifier and/or the personal identifier based on at least one signal transmitted between said base stations and the vehicle identifier and/or the personal identifier.

8. The safety system as claimed in claim 7, wherein at least one base station is configured to transmit the position data of the vehicle identifier and/or the personal identifier to a server.

9. The safety system as claimed in claim 1, further comprising a reader of a remote identifier and a remote identifier installed in the personal identifier and capable of radio communication, the remote identifier being configured to open a locked door when the remote identifier is taken close to the remote identifier reader.

10. The safety system as claimed in claim 9, wherein the remote identifier is an RFID tag and the remote identifier reader is an RFID reader.

11. The safety system as claimed in claim 1, wherein said vehicle identifier comprises communication means configured to set up a wired and/or wireless connection with and to transmit data to or receive it from at least one of the following: the alarm unit, the personal identifier, the counter radio, and the sensor.

12. The safety system as claimed in claim 1, wherein said alarm unit comprises communication means configured to set up a wired and/or wireless connection with and to transmit data to or receive it from at least the vehicle identifier.

13. The safety system as claimed in claim 1, wherein said personal identifier comprises communication means configured to set up a wireless connection with and to transmit data to or receive it from at least one of the following: the vehicle identifier, the counter radio, and the remote identifier reader.

14. The safety system as claimed in claim 1, wherein selective radio communication between the personal identifier and the vehicle identifier, without requiring a direct line-of-sight therebetween.

15. A method for activating a safety system, the safety system comprising a vehicle identifier arranged in connection with a moving vehicle or work machine and capable of radio communication and, arranged in an operating connection therewith, an alarm unit, and a personal identifier arranged in connection with a moving unit and capable of radio communication, the personal identifier comprising an alerting device for warning of vehicles or work machines in the area and said alarm unit comprises warning equipment for warning of moving units in the area, wherein:

the vehicle identifier and/or the personal identifier determines a distance between the vehicle identifier and the personal identifier based on at least one signal transmitted between the vehicle identifier and the personal identifier;

the vehicle identifier activates the warning equipment in response to the determined distance between the vehicle identifier and the personal identifier being less than a threshold value determined in advance for the vehicle identifier;

the personal identifier activates the alerting device in response to the predetermined distance between the vehicle identifier and the personal identifier being less than a threshold value determined in advance for the personal identifier;

wherein the safety system further comprises a counter radio capable of radio communication, wherein the counter radio broadcasts a spherical signal, and wherein:

the personal identifier determines a distance between the personal identifier and the counter radio based on the at least one signal transmitted between the personal identifier and the counter radio; and the personal identifier interrupts the transmission of the at least one signal transmitted between the vehicle identifier and the personal identifier and the activation of the alerting device and warning equipment, in response to the determined distance between the personal identifier and the counter radio being less than the threshold value determined in advance for the counter radio.

16. The method as claimed in claim 15, further comprising selectively enabling radio communication between the personal identifier and the vehicle identifier, without requiring a direct line-of-sight therebetween.

* * * * *